(12) United States Patent
Song et al.

(10) Patent No.: US 11,764,864 B2
(45) Date of Patent: Sep. 19, 2023

(54) ADAPTIVE SATELLITE-AIMING METHOD FOR LOW-ORBIT MOBILE SATELLITE COMMUNICATION NETWORK

(71) Applicant: ZHEJIANG UNIVERSITY, Hangzhou (CN)

(72) Inventors: Chunyi Song, Hangzhou (CN); Qin Chen, Hangzhou (CN); Yuying Xu, Hangzhou (CN); Zhiwei Xu, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 56 days.

(21) Appl. No.: 16/965,008

(22) PCT Filed: Sep. 4, 2019

(86) PCT No.: PCT/CN2019/104261
§ 371 (c)(1),
(2) Date: Jul. 26, 2020

(87) PCT Pub. No.: WO2020/248399
PCT Pub. Date: Dec. 17, 2020

(65) Prior Publication Data
US 2023/0155670 A1    May 18, 2023

(30) Foreign Application Priority Data
Jun. 10, 2019   (CN) ........................ 201910497201.X

(51) Int. Cl.
*H04B 7/15*   (2006.01)
*H04B 7/04*   (2017.01)
(Continued)

(52) U.S. Cl.
CPC ......... *H04B 7/18519* (2013.01); *H04B 7/086* (2013.01); *H04B 7/195* (2013.01)

(58) Field of Classification Search
CPC .......... H01Q 3/26; H01Q 3/2605; H01Q 3/30; H01Q 3/34; H04B 7/04; H04B 7/08;
(Continued)

(56) References Cited

U.S. PATENT DOCUMENTS

| | | | |
|---|---|---|---|
| 6,075,484 A * | 6/2000 | Daniel | ...................... G01S 3/74 |
| | | | 342/372 |
| 6,191,734 B1 | 2/2001 | Park et al. | |

(Continued)

FOREIGN PATENT DOCUMENTS

| CN | 102147962 A | 8/2011 |
|---|---|---|
| CN | 104239731 A | 12/2014 |

(Continued)

OTHER PUBLICATIONS

International search report (PCT/CN2019/104261); dated Mar. 9, 2020.

(Continued)

*Primary Examiner* — Blane J Jackson
(74) *Attorney, Agent, or Firm* — W&G Law Group

(57) ABSTRACT

The present disclosure discloses an adaptive satellite-aiming method for a low-orbit mobile satellite communication network. The method first receives signals through an array antenna, estimates an offset angle between an array antenna and a satellite beam using a MUSIC-based angle estimation method; then, based on the estimated offset angle, tracks a satellite direction using the adaptive coupling model and achieves tracking and alignment of an antenna direction based on feature parameters extracted during a tracking process; finally, based on the obtained feature parameters, adjusts parameters in the MUSIC-based angle estimation method, and repeats the above steps, to achieve real-time estimation of the offset angle and real-time tracking and alignment of the antenna direction.

4 Claims, 2 Drawing Sheets

(51) Int. Cl.
*H01Q 3/26* (2006.01)
*H04B 7/185* (2006.01)
*H04B 7/08* (2006.01)
*H04B 7/195* (2006.01)

(58) Field of Classification Search
CPC .......... H04B 7/086; H04B 7/15; H04B 7/185; H04B 7/18519
See application file for complete search history.

(56) References Cited

U.S. PATENT DOCUMENTS

| | | |
|---|---|---|
| 2004/0001720 A1 | 1/2004 | Krill et al. |
| 2016/0170019 A1 | 6/2016 | Owirka et al. |
| 2017/0237456 A1* | 8/2017 | Shaker .................. A61H 9/0078 455/65 |

FOREIGN PATENT DOCUMENTS

| | | | |
|---|---|---|---|
| CN | 105549005 A | 5/2016 | |
| CN | 106329122 A | 1/2017 | |
| CN | 106772466 A | 5/2017 | |
| CN | 106908811 A | 6/2017 | |
| CN | 107783156 A | 3/2018 | |
| CN | 108493611 A | 9/2018 | |
| EP | 2669708 A1 * | 12/2013 | ............. G01S 19/21 |
| WO | WO-2016032742 A1 * | 3/2016 | ............. H01Q 1/125 |

OTHER PUBLICATIONS

First Office Action (201910497201X); dated Aug. 5, 2020.
Fast Mobile Target Tracking Based on Kalman Filter and Music Algorithm; Date of Mailing: Dec. 30, 2008.
Research on Adaptive Array Antenna Technology Based on Small Satellite Mobile Communication(machine translation); Date of Mailing: Jul. 27, 2012.
Notice of Allowance (201910497201X); dated Jun. 9, 2021.

* cited by examiner

US 11,764,864 B2

ADAPTIVE SATELLITE-AIMING METHOD FOR LOW-ORBIT MOBILE SATELLITE COMMUNICATION NETWORK

CROSS-REFERENCE TO RELATED APPLICATIONS

This application is a national stage of International Application No. PCT/CN2019/104261, filed on Sep. 4, 2019, which claims priority to Chinese Patent Application No. 201910497201.X, filed on Jun. 10, 2019. Both of the aforementioned applications are hereby incorporated by reference in their entireties.

TECHNICAL FIELD

The present disclosure relates to the field of satellite communications, and in particular, to an adaptive satellite-aiming method for a low-orbit mobile satellite communications network.

BACKGROUND

The satellite communication is an important means for information transmission in the contemporary society. However, with the development of the times, demands for communication in the contemporary society is increasing, and scenarios at two ends of the communication are becoming more and more complicated. In recent years, China has begun to build a global communications network based on low-orbit mobile satellites, and low-orbit broadband satellite networks provide communication capabilities that have large-bandwidth, flexibility and configurability, anti-interference, low-latency, and high-reliability, which can promote the development of communication. At present, all countries are actively participating in the wave of development of low-orbit satellites, and low-orbit satellite networks have been widely studied in 5G communications and the Internet of Things.

Compared with an existing satcom on the move communication system based on geostationary satellites, receiving and transmitting terminals of the satellite communication system based on the low-orbit satellite keep moving at the same time, so it is defined as a "moving-communication" communication system. In the moving-communication network, multi-dimensional coupling motion between the moving terminal and the low-orbit satellite makes an offset angle between an array antenna beam of the moving terminal and a satellite beam present complex dynamic characteristics, and beams of the two frequently deviate from an alignment direction, which means that a speed and an accuracy of beam alignment have a significant impact on the network capacity. A traditional satellite-aiming algorithm is achieved by mechanically scanning the antenna, the antenna direction is controlled by a mechanical servo mechanism, and received signal strengths in different directions are compared, so as to estimate the satellite direction; existing moving terminal satellite-aiming systems generally use a combination of open-loop tracking and closed-loop tracking to perform satellite-aiming, but full idealized compensation cannot be achieved.

SUMMARY

In view of the shortcomings in the related art, an object of the present disclosure is to provide an adaptive satellite-aiming method for a low-orbit mobile satellite communication network. Specific technical solutions are as follows.

An adaptive satellite-aiming method for a low-orbit mobile satellite communication network is provided, the method includes following steps:

Step S1: initializing all tracking feature parameters of a local layer and a global layer of an adaptive coupling model;

Step S2: receiving a signal through an array antenna, and estimating an offset angle between an array antenna beam and a satellite beam using a MUSIC-based angle estimation method;

Step S3: tracking a satellite direction using the adaptive coupling model based on the estimated offset angle, and achieving tracking and alignment of an antenna direction based on feature parameters extracted during the tracking of the satellite direction; and Step S4: adjusting parameters in the MUSIC-based angle estimation method based on the feature parameters obtained in the Step S3, and returning to the Step S2 for achieving real-time estimation of the offset angle and real-time tracking and alignment of the antenna direction.

Further, the Step S1 includes:
setting an initial value of a search range φ of the array antenna to an entire airspace, and setting an initial value of a number of sampling points as n; initializing all the tracking feature parameters of the local layer and the global layer of the adaptive coupling model, taking an azimuth angle A(t) and an pitch angle E(t) of the satellite direction and tracking values of angular velocities respectively corresponding to the azimuth angle A(t) and the pitch angle E(t) as parameters of a state matrix $X_t$ at time t, setting a tracking interval $\Delta T$, taking time t=0 as a tracking start time, and taking an observation value $Y_t$ at the time t=0 as an initial value of the state matrix; setting a layering length of the local layer as N, taking observation values $[Y_t, Y_{t-1}, \ldots, Y_{t-N+1}]$ as a layering feature of the local layer at time t, and setting an initial value of a tracking error P, an initial value of a process error Q, and an initial value of an observation error R of the feature parameters, where the initial value of the tracking error P is equal to the initial value of the observation error R.

Further, the Step S2 includes:
Sub-step S2.1: dividing the airspace, and performing spiral spatial scanning on each divided airspace around a beam direction by beamforming within a search range e after determining a beam direction of the array antenna;

Sub-step S2.2: obtaining a received signal X(t) in a scanning direction in which a maximum received signal power has been searched, after one spatial scanning;

Sub-step S2.3: calculating a covariance matrix value $R_{XX}$ of the received signal X(t), then performing eigenvalues decomposing on the covariance matrix value using a following formula to obtain a signal subspace $U_S$ and a noise subspace $U_N$, $$R_{XX} = U\Sigma U^T = U_S \Sigma_S U_S^T + U_N \Sigma_N U_N^T \quad (1),$$

where $\Sigma_S$ and $\Sigma_N$ are eigenvalues of the two subspaces respectively, and T represents a transposition;

Sub-step S2.4: obtaining the offset angle through a following formula in the noise subspace $U_N$, $$\theta_{MUSIC} = \underset{\theta}{\operatorname{argmax}} \left[ \frac{1}{\alpha(\theta)^T \cdot U_N \cdot U_N^T \alpha(\theta)} \right], \quad (3)$$

where $\alpha(\theta) = [a_1, a_2, \ldots, a_K]^T$ represents phase information, and $\theta_{MUSIC}$ is a value of θ when the right function takes a maximum value; and Sub-step S2.5: obtaining an offset angle $\theta_A$ of the azimuth angle and an offset angle $\theta_E$ of the pitch angle through the Sub-steps S2.1 to S2.4, obtaining values of the azimuth angle A(t) and the pitch angle E(t) in the antenna direction through array antenna parameters, and then obtaining the observation value $Y_t$ at time t based on:

$$Y_t = \begin{bmatrix} A(t) + \theta_A \\ E(t) + \theta_E \end{bmatrix}.$$

Further, the Step S3 includes:
Sub-step S3.1: predicting a state matrix $X_{t|t-1}$ at time t based on a state $X_{t-1}$ and a motion situation at time t−1, wherein $$X_{t|t-1} = FX_{t-1} \quad (2),$$

where F is a process matrix obtained based on the motion situation;
Sub-step S3.2: predicting a tracking error $P_{t|t-1}$ at time t based on a tracking error $P_{t-1}$ and the motion situation at time t−1, wherein $$P_{t|t-1} = FP_{t-1}F^T + Q \quad (3),$$

where T represents the transposition;
Sub-step S3.3: obtaining an estimated value $X_t$ of the state matrix at a current moment based on the $X_{t|t-1}$ and the $Y_t$, and changing an antenna beam direction to perform antenna alignment;

$$X_t = X_{t|t-1} + K_t(Y_t - HX_{t|t-1}), \quad (4)$$

where $K_t = (HP_{t|t-1}H^T + R),$ $$H = \begin{pmatrix} 1 & 0 \\ 0 & 0 \\ 0 & 1 \\ 0 & 0 \end{pmatrix};$$

Sub-step S3.4: obtaining the estimated value $P_t$ of the tracking error at the current moment based on:

$$P_t = (I - K_t H)P_{t|t-1} \quad (5);$$

Sub-step S3.5: solving a minimized loss function $L_a(n, \varphi)$ on basis of satisfying following three conditions, and obtaining the number n of sampling points, the scanning range p, and the observation error $R_t$;
① $T(n)\varphi \leq T_{all}$;
② $\varphi \leq c\bar{b}\Delta T$; and
③ $\hat{\sigma}_R^2 = \hat{f}(n)$;
where BR is a variance of the observation error R, $\hat{f}(n)$ is a fitting curve of a detection accuracy and the number n of the sampling points based on an offset angle estimation algorithm, T(n) is a sampling duration, $T_{all}$ is a total duration of one scanning, and c is a settable constant; and
Sub-step S3.6: reinitializing the tracking error P, the process error Q and the observation error R of the feature parameters when t<N; estimating Q by a weighted linear fitting method when t≥N, that is, firstly, estimating linear parameters $\bar{a}$ and $\bar{b}$ through minimizing a linear loss function $L_s(\bar{a},\bar{b})$, then performing linear fitting approximation, and finally estimating a variance $\hat{\sigma}_F^2$ of Q.
Further, the Step S4 includes:
Sub-step S4.1: assigning the number n of the sampling points and the scanning range p, which are obtained in Sub-step S3.5, to a number n of sampling points and a scanning range e of a MUSIC algorithm at time t+1; and Sub-step S4.2: setting t=t+1 and returning to the Step S2.
Beneficial effects of the present disclosure are as follows.
The adaptive satellite-aiming method for the low-orbit mobile satellite communication network focus on studies about the beam alignment technology of the array antenna and the low-orbit satellite, with a view to reducing an offset angle estimation error caused by the multi-dimensional coupling motion, to effectively improve a speed and an accuracy of dynamic offset angle estimation, thereby improving the speed and the accuracy for antenna alignment and achieving real-time alignment of the antenna and the satellite.

DESCRIPTION OF EMBODIMENTS

Figure 1:
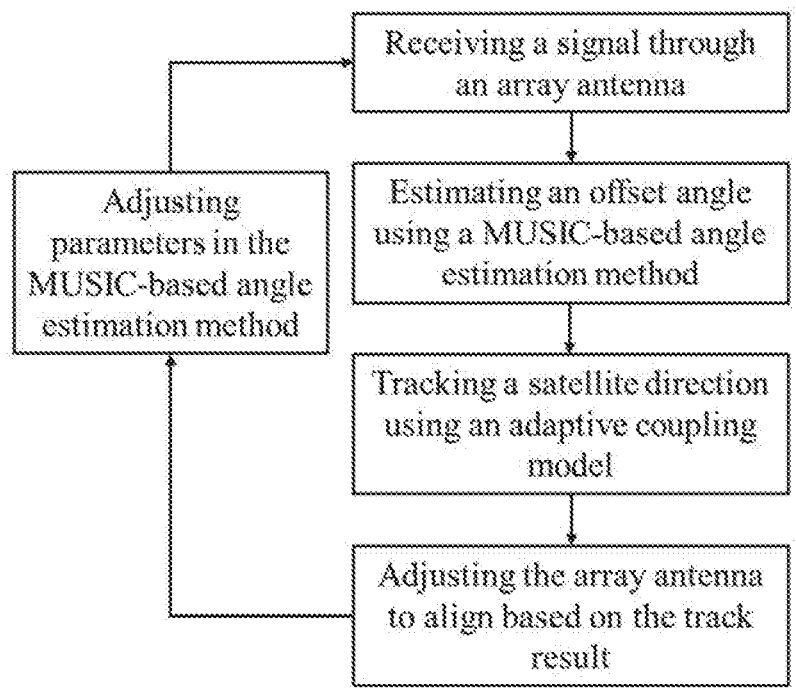
FIG. 1 is a design flowchart of an adaptive satellite-aiming algorithm for a low-orbit mobile satellite communication network.

The present disclosure is described in detail below with reference to the drawings and preferred embodiments, and the object and effect of the present disclosure will become clearer. The present disclosure will be further described in detail below with reference to the drawings and embodiments. It should be understood that the specific embodiments described herein are only used to explain the present disclosure and are not intended to limit the present disclosure.
An adaptive satellite-aiming method for a low-orbit mobile satellite communication network is provided, and as shown in FIG. 1, the method includes following steps.
At step S1, all tracking feature parameters of a local layer and a global layer of an adaptive coupling model are initialized.
An initial value of a search range p of an array antenna is set to an entire airspace, an initial value of the number of sampling points is set as n, all the tracking feature parameters of the local layer and the global layer of the adaptive coupling model are initialized, tracking values of an azimuth angle A(t) and an pitch angle E(t) of a satellite direction and their corresponding angular velocities are taken as parameters of a state matrix $X_t$ at time t, a tracking interval $\Delta T$ is set, time t=0 is taken as a tracking start time, an observation value $Y_t$ at time t=0 is taken as an initial value of the state matrix, a layering length of the local layer is set as N, the observation value $[Y_t, Y_{t-1}, \ldots, Y_{t-N+1}]$ is taken as a layering feature of the local layer at time t, an initial value of a tracking error P, an initial value of a process error Q, and an initial value of an observation error R of the feature parameters are set, and the initial value of the tracking error P is equal to the initial value of the observation error R;
At step S2, a signal is received through the array antenna, and an offset angle between an array antenna beam and a satellite beam is estimated using a MUSIC-based angle estimation method.

At sub-step S2.1, the airspace is divided, and after determining an array antenna beam direction, spiral spatial scanning is performed on each divided airspace around the beam direction by beamforming within the search range φ.

At sub-step S2.2, after one spatial scanning, a received signal X(t) is obtained in a scanning direction in which a maximum received signal power has been searched.

At sub-step S2.3, a covariance matrix value $R_{XX}$ of the received signal X(t) is calculated, then eigenvalues decomposing is performed on the covariance matrix value using a following formula to obtain a signal subspace $U_S$ and a noise subspace $U_N$, $$R_{XX}=U\Sigma U^T=U_S\Sigma_S U_S^T+U_N\Sigma_N U_N^T \quad (1),$$

where $\Sigma_S$ and $\Sigma_N$ are eigenvalues of the two subspaces respectively, and T represents a transposition;

At sub-step S2.4, the offset angle is obtained by a following formula in the noise subspace $U_N$, $$\theta_{MUSIC} = \underset{\theta}{\mathrm{argmax}}\left[\frac{1}{\alpha(\theta)^T \cdot U_N \cdot U_N^T \alpha(\theta)}\right], \quad (2)$$

where $\alpha(\theta)=[a_1, a_2, \ldots, a_K]^T$ represents phase information, and $\theta_{MUSIC}$ is a value of $\theta$ when the right function takes a maximum value.

At sub-step S2.5, an offset angle $\theta_A$ of the azimuth angle and an offset angle $\theta_E$ of the pitch angle is obtained through sub-steps S2.1 to S2.4, the values of the azimuth angle A(t) and the pitch angle E(t) in the antenna direction through the array antenna parameters is obtained, and then the observation value $Y_t$ is obtained at time t based on:

$$Y_t = \begin{bmatrix} A(t)+\theta_A \\ E(t)+\theta_E \end{bmatrix}, \quad (3)$$

At step S3, the satellite direction is tracked using the adaptive coupling model based on the estimated offset angle, and tracking and alignment of the antenna direction is achieved based on the feature parameters extracted during the tracking of the satellite direction.

The feature parameters in the motion tracking problem are represented through the local layer and the global layer in adaptive coupling model, the local layer is used to track short-period rapid change features caused by ship motion, and the global layer is used to continuously track the satellite motion features, so as to realize decoupling of multi-dimensional motion.

At sub-step S3.1, the state matrix $X_{t|t-1}$ at time t is predicted according to a state $X_{t-1}$ and a motion situation at time t−1, where $$X_{t|t-1}=FX_{t-1} \quad (4),$$

where F is a process matrix obtained according to the motion situation.

At sub-step S3.2, the tracking error $P_{t|t-1}$ at time t is predicted according to a tracking error $P_{t-1}$ and the motion situation at time t−1, where $$P_{t|t-1}=FP_{t-1}F^T+Q \quad (5),$$

where T represents a transposition.

At sub-step S3.3, an estimated value $X_t$ of the state matrix at a current moment is obtained according to the $X_{t|t-1}$ and the $Y_t$, and the antenna beam direction is changed to perform antenna alignment, where $$X_t = X_{t|t-1} + K_t(Y_t - HX_{t|t-1}), \quad (6)$$

where $K_t = (HP_{t|t-1}H^T + R)$, $$H = \begin{pmatrix} 1 & 0 \\ 0 & 0 \\ 0 & 1 \\ 0 & 0 \end{pmatrix}.$$

At sub-step S3.4, the estimated value $P_t$ of the tracking error at the current time is obtained according to a following formula, $$P_t=(I-K_tH)P_{t|t-1} \quad (7).$$

At sub-step S3.5, a minimized loss function $L_a(n, \varphi)$ is solved on the basis of satisfying following three conditions, and the number of sampling points n, the scanning range φ, and the observation error $R_t$ are obtained.

① $T(n)\varphi \leq T_{all}$;
② $\varphi \geq c\bar{b}\Delta T$; and
③ $\sigma_R^2 = \hat{f}(n)$;

where BR is a variance of the observation error R, $\hat{f}(n)$ is a fitting curve of detection accuracy and the number n of the sampling points based on an offset angle estimation algorithm, T(n) is sampling duration, $T_{all}$ is a total duration of one scanning, and c is a settable constant.

At sub-step S3.6, when t<N, the tracking error P, the process error Q and the observation error R of the feature parameters are reinitialized; when t≤N, Q is estimated by a weighted linear fitting method, that is, firstly, estimating linear parameters $\bar{a},\bar{b}$ by minimizing a linear loss function $L_s(\bar{a},\bar{b})$, then performing linear fitting approximation, and finally estimating a variance $\hat{\sigma}_F^2$ of Q.

At step S4, according to the feature parameters obtained in step S3, the parameters in the MUSIC-based angle estimation method is adjusted, and the S2 is returned to for achieving real-time estimation of the offset angle and real-time tracking and alignment of the antenna direction.

At sub-step S4.1, the number of the sampling points n and the scanning range φ, which are obtained in Sub-step S3.5, are respectively assigned to the number of the sampling points n and the scanning range p of the MUSIC algorithm at time t+1.

At sub-step S4.2, t=t+1 and the step S2 is returned to.

Figure 2:
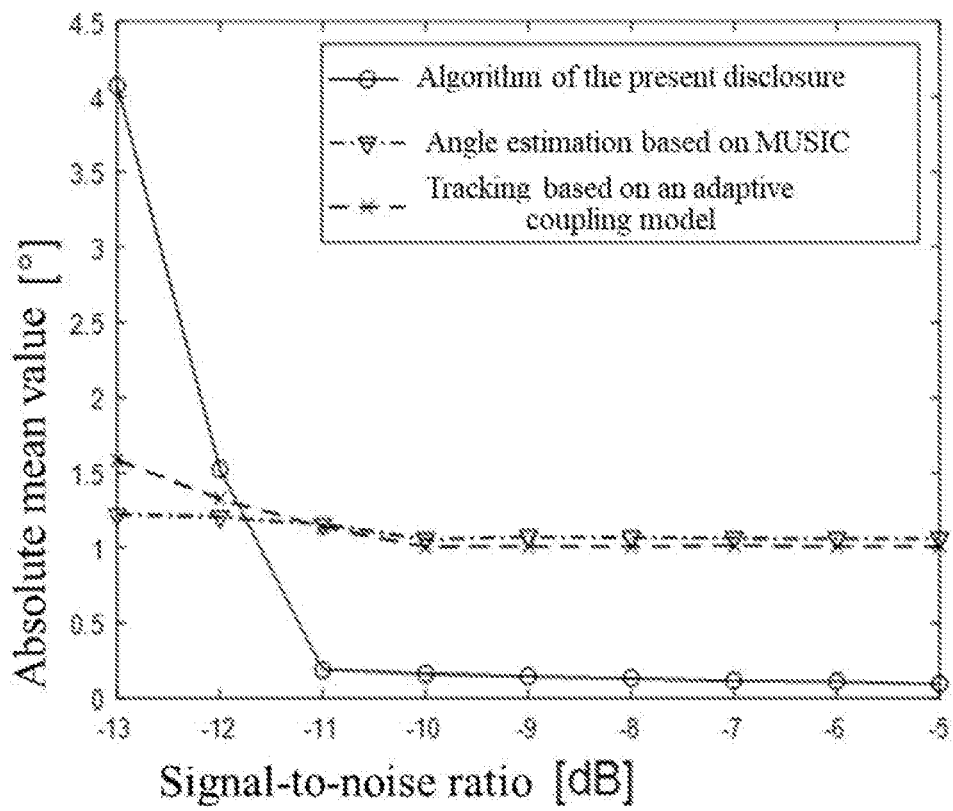
FIG. 2 is a diagram illustrating relationships between an absolute mean value and a signal-to-noise ratio for a satellite-aiming method of the present disclosure, a satellite-aiming method based on a MUSIC angle estimation, and a satellite-aiming method based on an adaptive coupling model.
Figure 3:
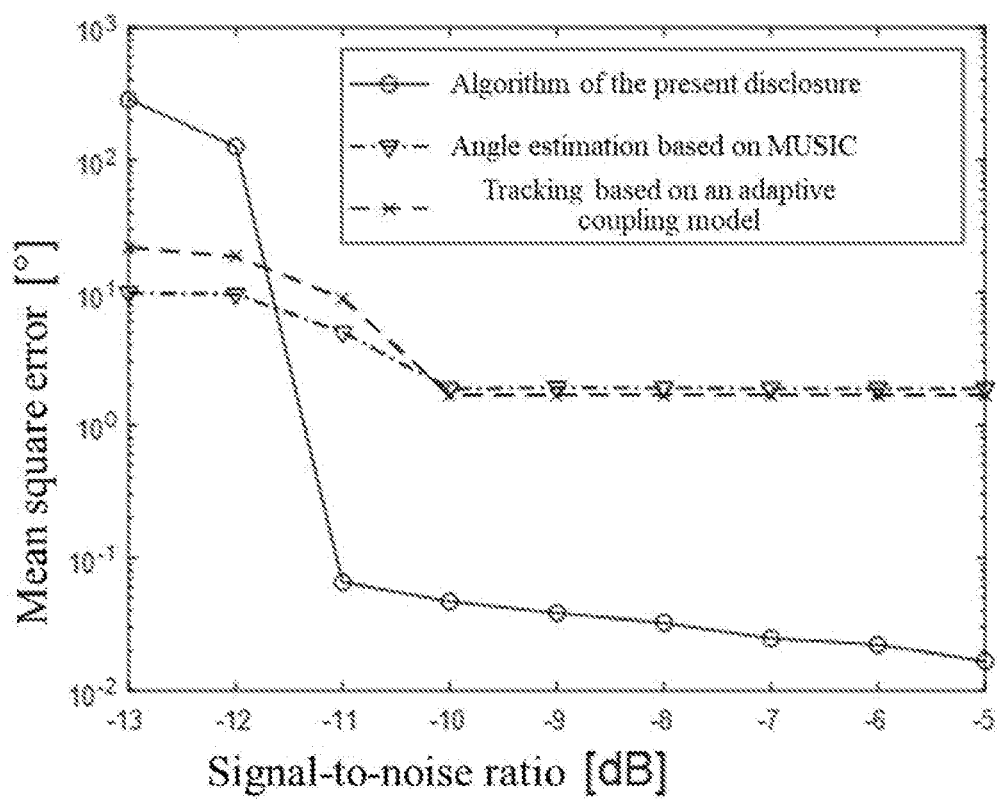
FIG. 3 is a diagram illustrating relationships between a mean square error and a signal-to-noise ratio for a satellite-aiming method of the present disclosure, a satellite-aiming method based on a MUSIC angle estimation, and a satellite-aiming method based on an adaptive coupling model.

FIG. 2 and FIG. 3 are diagrams illustrating relationships between an absolute mean value, a mean square error, and a signal-to-noise ratio for three methods including the satellite-aiming method of the present disclosure, a satellite-aiming method based on a MUSIC angle estimation, and a satellite-aiming method based on the adaptive coupling model. It can be seen from FIG. 2 and FIG. 3 that the satellite-aiming method of the present disclosure has higher accuracy and better stability than the other two methods.

Those of ordinary skill in the art can understand that the above description only illustrates preferred embodiments of the present disclosure and is not used to limit the present disclosure. Although the present disclosure has been described in detail with reference to the foregoing embodiments, those skilled in the art can still modify the technical solutions described in the foregoing embodiment or replace some of the technical features equivalently. Any modification, equivalent replacement, etc. made within the spirit and principle of the present disclosure shall fall in the protection scope of the present disclosure.

What is claimed is:

1. An adaptive satellite-aiming method for a low-orbit mobile satellite communication network, comprising:

Step S1: initializing all tracking feature parameters of a local layer and a global layer of an adaptive coupling model;

Step S2: receiving a signal through an array antenna, and estimating an offset angle between an array antenna beam and a satellite beam using a MUSIC-based angle estimation method;

Step S3: tracking a satellite direction using the adaptive coupling model based on the estimated offset angle, and achieving tracking and alignment of an antenna direction based on feature parameters extracted during the tracking of the satellite direction; and Step S4: adjusting parameters in the MUSIC-based angle estimation method based on the feature parameters obtained in the Step S3, and returning to the Step S2 for achieving real-time estimation of the offset angle and real-time tracking and alignment of the antenna direction;

wherein the Step S1 comprises:

setting an initial value of a search range φ of the array antenna to an entire airspace, and setting an initial value of a number of sampling points as n;

initializing all the tracking feature parameters of the local layer and the global layer of the adaptive coupling model, taking an azimuth angle A(t) and an pitch angle E(t) of the satellite direction and tracking values of angular velocities respectively corresponding to the azimuth angle A(t) and the pitch angle E(t) as parameters of a state matrix $X_t$ at time t, setting a tracking interval ΔT, taking time t=0 as a tracking start time, and taking an observation value $Y_t$ at the time t=0 as an initial value of the state matrix; and setting a layering length of the local layer as N, taking observation values $[Y_t, Y_{t-1}, \ldots, Y_{t-N+1}]$ as a layering feature of the local layer at time t, and setting an initial value of a tracking error P, an initial value of a process error Q, and an initial value of an observation error R of the feature parameters, wherein the initial value of the tracking error P is equal to the initial value of the observation error R.

2. The adaptive satellite-aiming method according to claim 1, wherein the Step S2 comprises:

Sub-step S2.1: dividing the airspace, and performing spiral spatial scanning on each divided airspace around a beam direction by beamforming within a search range y after determining a beam direction of the array antenna;

Sub-step S2.2: obtaining a received signal X(t) in a scanning direction in which a maximum received signal power has been searched, after one spatial scanning;

Sub-step S2.3: calculating a covariance matrix value $R_{XX}$ of the received signal X(t), then performing eigenvalues decomposing on the covariance matrix value using a following formula to obtain a signal subspace $U_S$ and a noise subspace $U_N$, $$R_{XX}=U\Sigma U^T=U_S\Sigma_S U_S^T+U_N\Sigma_N U_N^T \quad (1),$$

where $\Sigma_S$ and $\Sigma_N$ are eigenvalues of the two subspaces respectively, and T represents a transposition;

Sub-step S2.4: obtaining the offset angle through a following formula in the noise subspace $U_N$, $$\theta_{MUSIC} = \underset{\theta}{\text{argmax}} \left[ \frac{1}{\alpha(\theta)^T \cdot U_N \cdot U_N^T \alpha(\theta)} \right], \quad (2)$$

where $\alpha(\theta)=[a_1, a_2, \ldots, a_K]^T$ represents phase information, and $\theta_{MUSIC}$ is a value of 0 when the right function takes a maximum value; and Sub-step S2.5: obtaining an offset angle $\theta_A$ of the azimuth angle and an offset angle $\theta_E$ of the pitch angle through the Sub-steps S2.1 to S2.4, obtaining values of the azimuth angle A(t) and the pitch angle E(t) in the antenna direction through array antenna parameters, and then obtaining the observation value $Y_t$ at time t based on:

$$Y_t = \begin{bmatrix} A(t) + \theta_A \\ E(t) + \theta_E \end{bmatrix}. \quad (3)$$

3. The adaptive satellite-aiming method according to claim 2, wherein the Step S3 comprises:

Sub-step S3.1: predicting a state matrix $X_{t|t-1}$ at time t based on a state $X_{t-1}$ and a motion situation at time t−1, wherein $$X_{t|t-1}=FX_{t-1} \quad (4),$$

where F is a process matrix obtained based on the motion situation;

Sub-step S3.2: predicting a tracking error $P_{t|t-1}$ at time t based on a tracking error $P_{t-1}$ and the motion situation at time t−1, wherein $$P_t=(I-K_tH)P_{t|t-1} \quad (5);$$

where T represents the transposition;

Sub-step S3.3: obtaining an estimated value $X_t$ of the state matrix at a current moment based on the $X_{t|t-1}$ and the $Y_t$, and changing an antenna beam direction to perform antenna alignment;

$$X_t = X_{t|t-1} + K_t(Y_t - HX_{t|t-1}), \quad (6)$$

where $K_t = (HP_{t|t-1}H^T + R)$, $$H = \begin{pmatrix} 1 & 0 \\ 0 & 0 \\ 0 & 1 \\ 0 & 0 \end{pmatrix};$$

Sub-step S3.4: obtaining the estimated value $P_t$ of the tracking error at the current moment based on:

$$P_t=(I-K_tH)P_{t|t-1} \quad (7);$$

Sub-step S3.5: solving a minimized loss function $L_a(n,\varphi)$ on basis of satisfying following three conditions, and obtaining the number n of sampling points, the scanning range φ, and the observation error $R_t$;

① $T(n)\varphi \leq T_{all}$;
② $\varphi \geq c\bar{b}\Delta T$; and
③ $\hat{\sigma}_R^2 = \hat{f}(n)$;

where $\hat{\sigma}_R^2$ is a variance of the observation error R, $\hat{f}(n)$ is a fitting curve of a detection accuracy and the number n of the sampling points based on an offset angle estimation algorithm, T(n) is a sampling duration, $T_{all}$ is a total duration of one scanning, and c is a settable constant; and Sub-step S3.6: reinitializing the tracking error P, the process error Q and the observation error R of the feature parameters when t<N; estimating Q by a weighted linear fitting method when t≥N, that is, firstly, estimating linear parameters $\bar{a}$ and $\bar{b}$ through minimizing a linear loss function $L_s(\bar{a},\bar{b})$, then performing linear fitting approximation, and finally estimating a variance $\hat{\sigma}_F^2$ of Q.

4. The adaptive satellite-aiming method according to claim 3, wherein the Step S4 comprises:

Sub-step S4.1: assigning the number n of the sampling points and the scanning range φ, which are obtained in Sub-step S3.5, to a number n of sampling points and a scanning range φ of a MUSIC algorithm at time t+1; and Sub-step S4.2: setting t=t+1 and returning to the Step S2.

\* \* \* \* \*